Oct. 14, 1941.   D. J. COSGRO   2,259,025
CLEANING DEVICE FOR POTS AND PANS AND THE LIKE
Filed Feb. 15, 1941   2 Sheets-Sheet 1
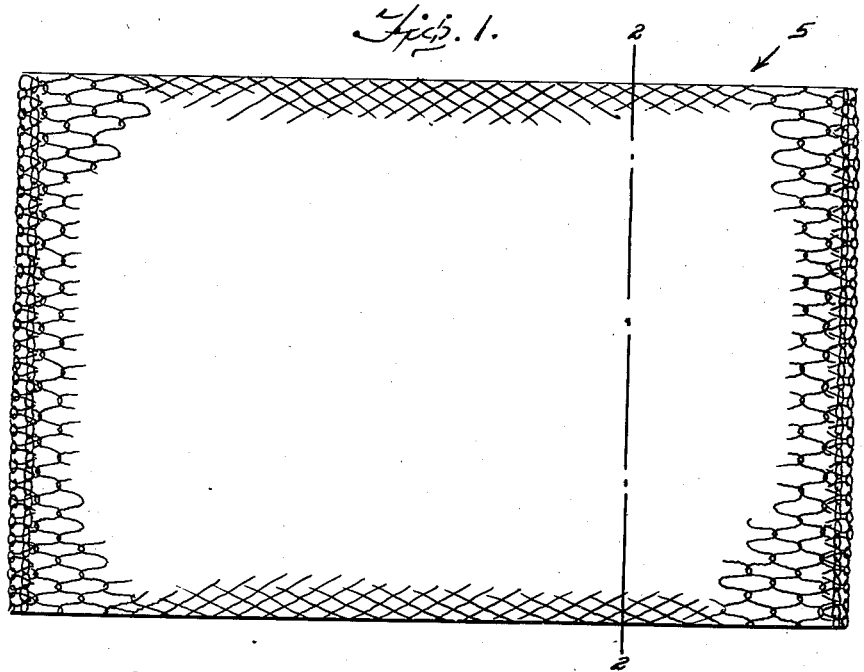
Fig. 1.
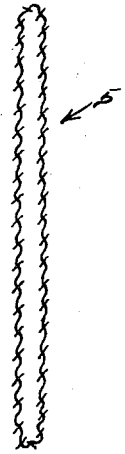
Fig. 2.
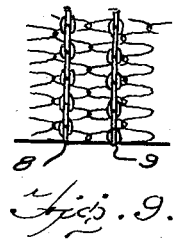
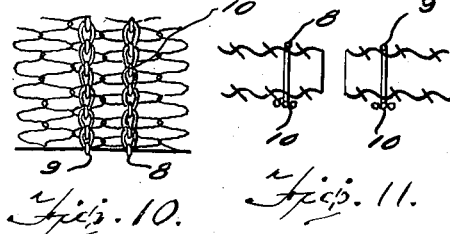
Fig. 9.   Fig. 10.   Fig. 11.
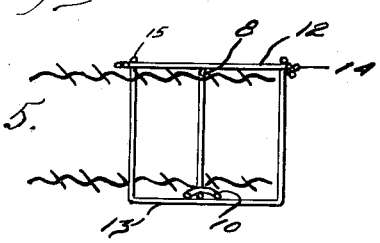
Fig. 5.
Fig. 8.
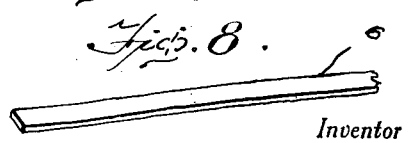
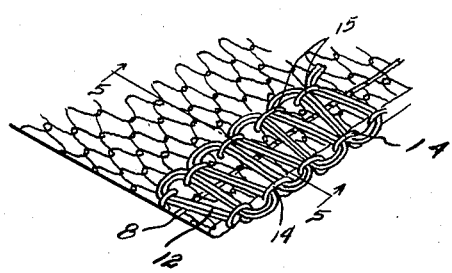
Fig. 3.
Inventor
Daniel J. Cosgro
By Clarence A. O'Brien
Attorney Oct. 14, 1941.  D. J. COSGRO  2,259,025
CLEANING DEVICE FOR POTS AND PANS AND THE LIKE
Filed Feb. 15, 1941  2 Sheets-Sheet 2
Fig. 6.
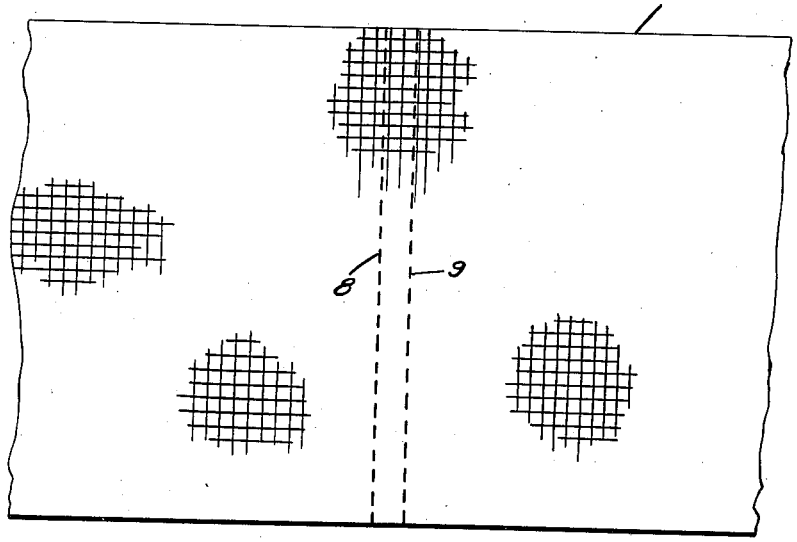
Fig. 7.
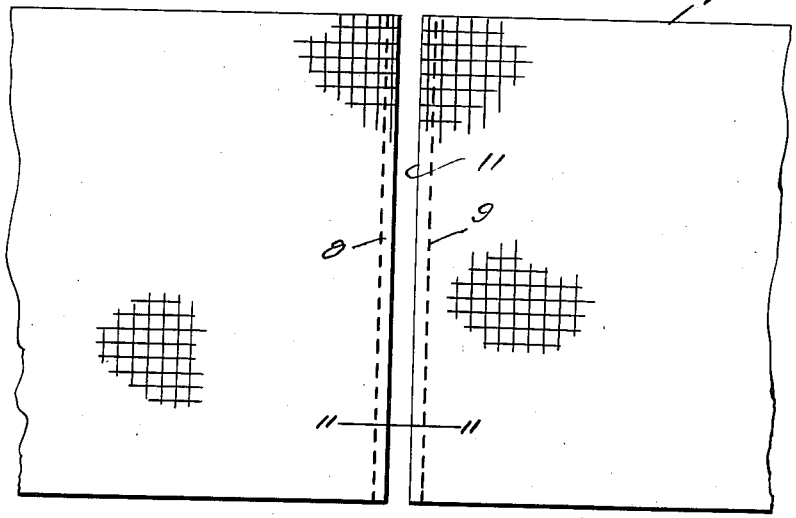
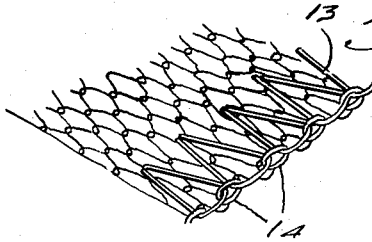
Fig. 4.
Inventor
Daniel J. Cosgro
By Clarence A. O'Brien
Attorney Patented Oct. 14, 1941

2,259,025

UNITED STATES PATENT OFFICE 2,259,025

CLEANING DEVICE FOR POTS AND PANS AND THE LIKE

Daniel J. Cosgro, Cohoes, N. Y.

Application February 15, 1941, Serial No. 379,131

3 Claims. (Cl. 15—209)

My invention relates to an improved device for the cleaning and scouring of pots and pans and the like, and to the method of making the same, and the primary object of my invention is to provide an efficient and inexpensive arrangement of this character which is characterized by substantially long life, shape retention, and ease of complete cleaning, promoting a sanitary condition.

Other important objects and advantages of my invention will be apparent from a reading of the following description taken in connection with the drawings, wherein for purposes of illustration I have shown the preferred embodiment of my invention.

In the drawings:

Figure 1 is a general plan view of the device.

Figure 2 is a transverse vertical sectional view taken along the line 2—2 of Figure 1.

Figure 3 is a fragmentary enlarged top perspective of a corner portion of the device detailing the retaining stitching on that side of the device.

Figure 4 is a view similar to Figure 3 of the reverse or bottom side.

Figure 5 is an enlarged fragmentary longitudinal sectional view taken along the line 5—5 of Figure 3 and looking in the direction of the arrows.

Figure 6 is a fragmentary plan view showing the manner in which the seamless tubing of flat copper wire mesh is prepared for cutting.

Figure 7 is a view similar to Figure 6 and showing the cutting completed.

Figure 8 is a fragmentary perspective view of the flat copper wire used in forming the seamless tube from which the device is constructed.

Figure 9 is an enlarged fragmentary bottom plan view of a portion of the preparatory sewing.

Figure 10 is a view similar to Figure 9 showing the top of the said sewing.

Figure 11 is an enlarged fragmentary longitudinal sectional view taken along the line 11—11 of Figure 7.

The present application repeats a substantial portion, but not all, of the disclosure of my copending application Serial No. 347,335, filed July 24, 1940, and entitled "Pot and pan cleaner."

The present invention is an improvement over the subject matter of the above-described application in that it is characterized by simplification, reduction in number of parts, and greater compactness and resistance to wear and disintegration, due to the formation and arrangement of the component parts.

Referring in detail to the drawings, the numeral 5 generally designates the present cleaning device which consists of a suitable length of seamless tubing knitted from flat flexible copper wire 6, the main body being produced by first sewing across the tubing 7 two lines 8 and 9 of lock stitching of the type shown in Figures 9, 10 and 11 and characterized on the bottom side by a smooth chain stitch and on the upper side as shown in Figure 10 by a relatively rough chain stitch characterized by knot-like projections 10. The lines of stitching 8 and 9 are spaced parallely across the flat copper wire tubing at the required distance, and with the stitching installed a cut is made along a line equally spaced from the lines of stitching as indicated by the numeral 11 in Figure 7, at the opposite ends to define the individual cleaning devices.

To properly bind the opposite ends of the device and prevent unraveling as well as to present a smooth wear-proof edge, I provide enveloping stitching of a character different from that used in the device of my prior application, and at the same time omit the taping characteristic thereof.

The enveloping stitching at the ends of the cleaning device is characterized by upper convolutions 12 and lower convolutions 13 as illustrated in Figures 3 and 4, respectively, both of which extend longitudinally inwardly from the cut edge to a point inwardly of the corresponding one of the lines 8 and 9 of stitching, on both sides of the device, otherwise described as the top and bottom thereof. The convolutions 12 and 13 are interrelated and connected at the extreme edge of the device as indicated by the numeral 14, so that the rough cut edges of the flat copper wire mesh are enveloped and protected and prevented from coming into contact with the hands of the user, and the sewing lines 8 and 9 are positively enveloped and protected from wear and contact with the work, whereby great resistance is provided to unraveling, resulting either from harsh contact of the device with objects being cleaned or with the hands of the operator, or unraveling as a result of wear of the stitchings 8 and 9 resulting in their weakening and relaxation with resultant loss of grip on the mesh.

Due to the open and unimpeded character of the mesh resulting from the foregoing constructions, dirt freely passes through the meshes and that which may be retained in the meshes is easily washed out, so that the device may be maintained in a sanitary and efficient condition at all times.

Referring in detail to Figures 3, 4 and 5, showing the convolutions of the overlapping stitchings functionally related to each other and to the lines of sewing 8 and 9, at the ends of the device, it will be apparent that an edging of a conventional type composed of upper and lower longitudinal lock stitch elements 12 and 13 is applied over and to extend on opposite sides of the lines 8 and 9, as particularly well shown in Figures 3 and 5. The upper and lower elements lie in side by side relation, with the plan of the resulting flat loops reversed, the inward end portions of the sides of the upper flat loops being connected by portions 15 of the lower loops, and the outward end portions of the sides of the upper loops being connected by the portions 14 of the lower loops. This results in a strong non-fraying edge on the opposite ends of the device which at the same time presents a soft and non-injurious edge to the work and to the hands of the worker.

Although I have shown and described herein a preferred embodiment of my invention, it is to be definitely understood that I do not wish to limit the application of the invention thereto except as may be required by the scope of the subjoined claims.

Having described the invention, what is claimed as new is:

1. A cleaning and scouring device of the character described, said device comprising a flat seamless tube of flat, flexible wire mesh, a line of lock stitch sewing paralleling each end of the tube and passing through the top and bottom plies of the tube, and an enveloping stitching on each end of said tube, said enveloping stitching comprising interconnected convolutions on the top and bottom of the end of the tube and comprising interlocking loops reaching from a point longitudinally inwardly from the line of lock stitch sewing and thereacross to a point longitudinally of the cut edge of the tube beyond the line of lock stitch sewing in protective relation to the upper and lower parts of the line of lock stitch sewing and the cut edges of the tube, said upper and lower convolutions being further interconnected above the said cut edge whereby the said interlocking loops of the upper and lower convolutions are in protective relation to said cut edge.

2. A cleaning and scouring device of the character described, said device comprising a flat seamless tube of flat, flexible wire mesh, a line of lock stitch sewing paralleling each end of the tube and passing through the top and bottom plies of the tube, and an enveloping stitching on each end of said tube, said enveloping stitching comprising interconnected convolutions on the top and bottom of the end of the tube and comprising interlocking loops reaching from a point longitudinally inwardly from the line of lock stitch sewing and thereacross to a point longitudinally of the cut edge of the tube beyond the line of lock stitch sewing in protective relation to the upper and lower parts of the line of lock stitch sewing and the cut edges of the tube, said upper and lower convolutions being further interconnected above the said cut edge whereby the said interlocking loops of the upper and lower convolutions are in protective relation to said cut edge, said tube being woven of flat, flexible copper wire, with the stitches of said lines of sewing and of said enveloping stitching passing through the meshes.

3. A method of making a cleaning device of the character described, said method consisting in flattening tubing of seamless flat-wire mesh, producing a pair of parallely spaced lines of sewing across said tubing wherein the stitches pass through registered meshes of the top and bottom plies of said tubing, cutting across the tubing between said lines to define a tube having a line of said sewing at each end, then enveloping the cut ends of said tube with enveloping stitching by forming interconnected convolutions on the top and bottom sides of the ends with the longitudinally inward ends of the convolutions passing through meshes of the tube at a point longitudinally inwardly from the said line of sewing, so that the said convolutions overlie the top and bottom portions of said line of sewing, and by interlocking the longitudinally outward parts of said convolutions along the cut edge of the tube.

DANIEL J. COSGRO.